Figure 1:
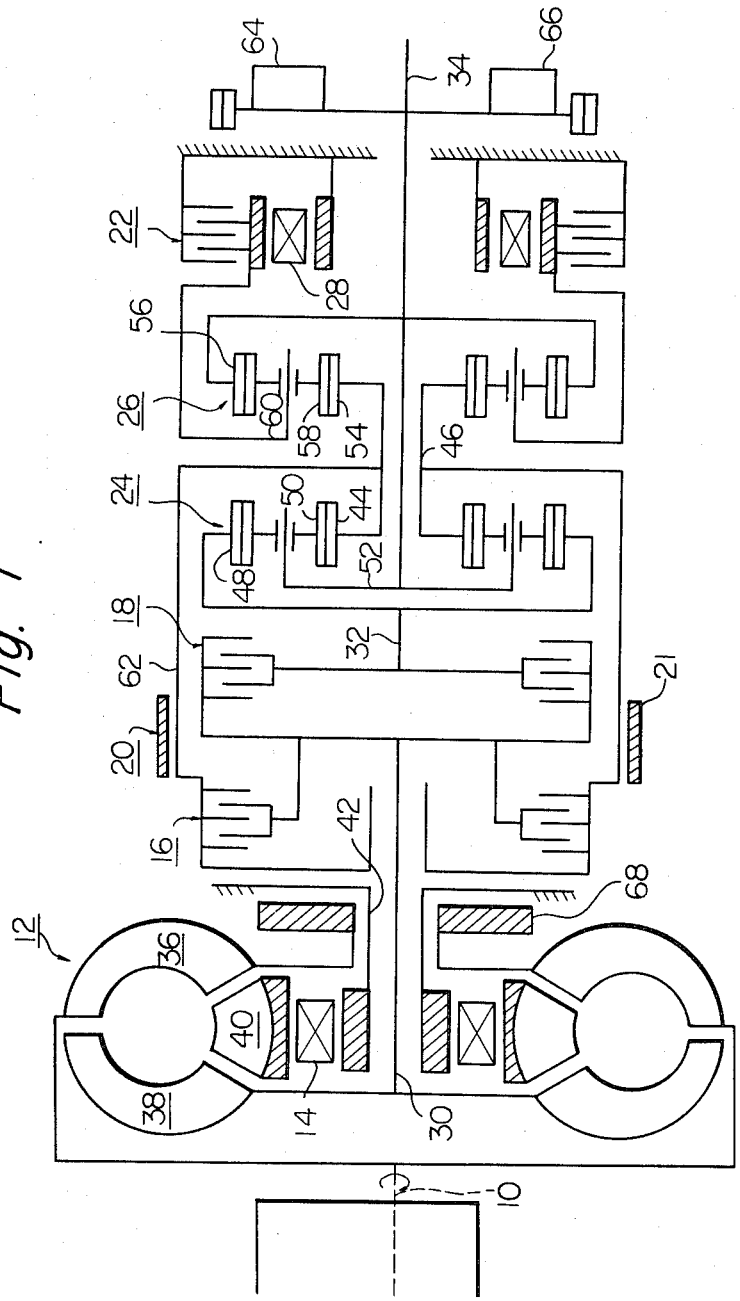

United States Patent [19]

Miyazaki

[11] 3,710,652
[45] Jan. 16, 1973

[54] HYDRAULIC CONTROL SYSTEM OF AUTOMATIC TRANSMISSION

[75] Inventor: Toshio Miyazaki, Yokohama, Japan

[73] Assignee: Nissan Motor Company, Limited, Yokohama City, Japan

[22] Filed: May 25, 1970

[21] Appl. No.: 40,276

[30] Foreign Application Priority Data

May 30, 1969  Japan ..............................44/41647

[52] U.S. Cl. ......................................74/864, 74/869
[51] Int. Cl. .............................................B60k 21/00
[58] Field of Search ................74/863, 864, 867–869

[56] References Cited

UNITED STATES PATENTS

| | | | |
|---|---|---|---|
| 3,004,446 | 10/1961 | Flinn | 74/863 X |
| 3,295,387 | 1/1967 | Leonard et al. | 74/864 |
| 3,424,037 | 1/1969 | Seaples et al. | 74/869 |
| 3,495,481 | 2/1970 | Ohie et al. | 74/864 |

FOREIGN PATENTS OR APPLICATIONS 1,923,809  11/1969  Germany ..............................74/864

Primary Examiner—Arthur I. McKeon
Attorney—McCarthy, Depaoli, O'Brien & Price

[57] ABSTRACT

A hydraulic control system of automatic transmission providing low, intermediate and high speed drive ratios, which control system has shift valve means for automatically controlling ratio changes between the low and intermediate speed ratios and second lock valve means for conditioning the transmission in its intermediate speed position. The two valve means are separately provided between a fluid pressure operated servo means for a clutch engaging element and a speed selector valve for varying the drive ratios.

4 Claims, 2 Drawing Figures

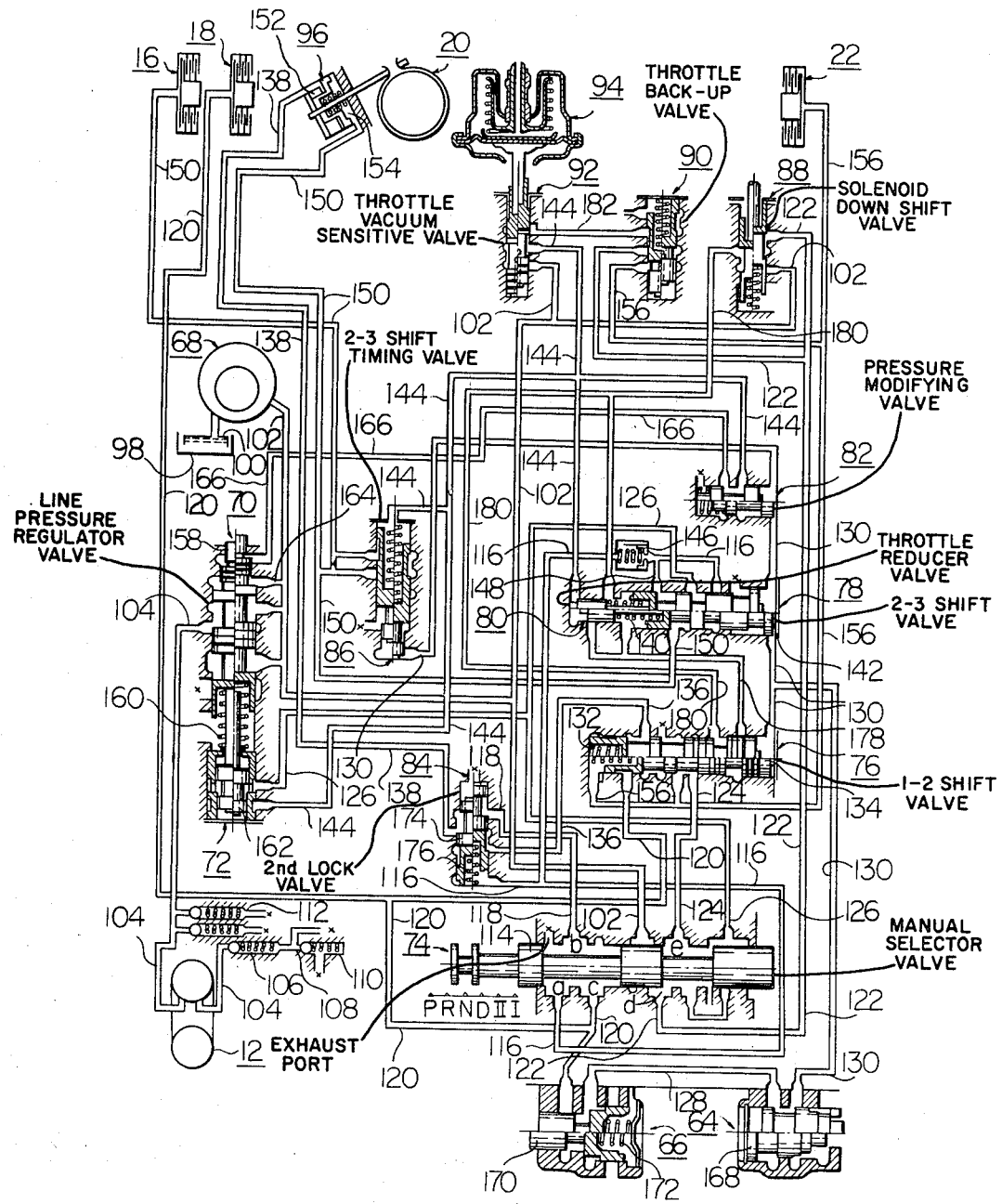

HYDRAULIC CONTROL SYSTEM OF AUTOMATIC TRANSMISSION

The present invention relates to automotive power transmissions and more particularly to a control system for an automotive automatic power transmission.

An automatic power transmission used in motor vehicles is usually provided with a hydraulic control system for controlling friction engaging elements, such as friction clutches and brakes, to provide a plurality of gear ratios selectively. In the hydraulic control system, it is a usual practice to have a manual speed selector valve moved selectively to positions in which fluid pressures are passed over to fluid pressure operated servo means of the clutches and brakes for causing the clutches and brakes to automatically engage or disengage thereby to transfer a driving power with desired gear ratio and torque to the driving wheels of the vehicle. The friction clutches serve as input transmitting elements to pass an input power therethrough and the friction brakes serve as reaction elements to bear reactive forces. When the manual speed selector lever, which is linked with the manual speed selector valve, is set to a "drive" or "D" position to select an automatic driving range, only a clutch need be engaged for the first forward speed in this driving range because a one-way brake stays effective in this condition but, for establishing the second forward speed, both a friction clutch and a friction brake need be actuated concurrently.

It is, in this instance, desired that, when the second speed is reached by the vehicle from the first speed in the D range, the gear train in the transmission be automatically shifted from the first to the second speed position in the D range and that, as soon as the selector valve is moved from the D to the manual second speed or "II" range position, then the gear train be shifted to and fixed in the II range position independently of the position of the selector valve insofar as the selector valve is held in the D range. A control valve is therefore provided in a fluid circuit linking the speed selector valve and the forward reaction brake. The control valve acts, in one phase, to keep the fluid circuit closed when the vehicle is driving at a speed lower than the second speed in the D range and to open the circuit as soon as the second speed is reached thereby to cause the gear train of the transmission to shift to the second speed position in the D range. The control valve serves, in the other phase, to apply the forward reaction brake as soon as the speed selector valve is moved from the D to the II range positions, whereby the II range is maintained irrespective of the variation in the vehicle speed.

These dual functions are accomplished in one and the same valve unit and, for this very reason, it is necessary that the control valve be constructed by a number of rather intricate members including a spool valve which is relatively heavy in weight. The use of such a heavy valve spool is reflected by a retarded response of the valve to the variation in the fluid pressure exerted thereto, inviting a deviation in the timing at which the automatic shifting between the first and second speeds in the D range takes place.

It is, therefore, an object of the invention to provide an improved hydraulic control system for an automotive automatic transmission using control valve means which is simple in construction, whereby the shifting between the first and second speeds in the D range is effected quickly and reliably without respect of the position of the selector valve.

It is another object of the invention to provide a hydraulic control system having control valve means which is adapted to hold the transmission fixedly in the II range position once the speed selector valve is shifted from the D to the II range position.

In the accompanying drawings:

FIG. 1 is a schematic view of an example of the power train of a transmission with which the improved control system of the present invention are to be used; and FIG. 2 is a schematic diagram of the fluid circuit of the control system of the present invention.

Referring first to FIG. 1, the power train of the transmission is shown to be of planetary gear type with a hydraulic torque converter for illustrative purposes only but it will be understood that the hydraulic control system according to the invention may be used with any other types of power train so far as the same is operated with a fluid pressure. The power train shown in FIG. 1 comprises a drive shaft 10 which may be connected to the usual crank shaft (not shown) of the engine, a hydraulic torque converter 12 with one-way brake 14, hydraulically operated friction clutches 16 and 18, hydraulically operated friction brakes 20 and 22, first and second planetary gear sets 24 and 26, a one-way brake 28, an input or turbine shaft 30, an intermediate shaft 32, and a driven shaft 34 connected by any suitable means (not shown) to the driving wheels of the vehicle.

The hydraulic torque converter 12 comprises, as customary, a bladed impeller or pump 36, a bladed rotor or turbine 38, and a bladed reaction element or stator 40. The impeller 36 is driven from the drive shaft 10 and the turbine 38 is fixed to the turbine shaft 30. The stator 40 is rotatably mounted on a stationary sleeve 42 and is prevented from rotating in the direction opposite to the direction of rotation of the drive shaft 10 by the one-way brake 14 which is disposed between the stator 40 and the sleeve 42.

The torque converter 12 operates in a manner well known and functions to drive the turbine 38 fixed to the shaft 30 at a higher torque than the input torque impressed on the impeller 36 driven by the drive shaft 10.

The first planetary gear set 24 comprises an externally toothed sun gear 44 which is fixed on a sleeve 46 which is rotatable with the driven shaft 34, an internally toothed ring gear 48 fixed to and rotatable with the intermediate shaft 32, and at least one planet pinion 50 meshing with both the sun and ring gears 44 and 46, respectively, and carried by a pinion carrier 52 connected with the driven shaft 34.

The second planetary gear set 26, similarly, comprises a sun gear 54 which is fixed on the sleeve 46, a ring gear 56 fixed to the driven shaft 34, and at least one planet pinion 58 carried by a pinion carrier 60. The planet pinions 58 are in mesh with the sun and ring gears 54 and 56, respectively, so as to rotate and revolve together. The reverse and high clutch 16 functions to connect the turbine shaft 30 with the sleeve 46 through a brake drum 62 so that the sun gears 44 and 54 rotate with the turbine shaft 30. The forward clutch 18 functions to connect the shaft 30 with the ring gear 48 of the first planetary gear set 24 through the intermediate turbine shaft 32 so that the ring gear 48 rotates with the shaft 32. The second brake 20 is shown to have a brake band 21 adapted to contract against the drum 62 which is fixed to the sleeve 46 for thereby locking both of the sun gears 44 and 54. The reverse and low brake 22 functions to lock the pinion carrier 60 of the second planetary gear set 26. The one-way brake 28 may be of any suitable construction insofar as it functions to allow a free rotation of the pinion carrier 60 in the direction in which the drive shaft 10 rotates but not in the direction reverse thereto. A first and second governor valve 64 and 66 are mounted on the driven shaft 34 to produce a speed responsive governor pressure.

A low speed forward drive ratio in the manual first speed or "I" range position is established by engaging the forward clutch 18 only. The turbine torque developed by the torque converter 12 is then distributed through the shaft 30 and the engaged clutch to the ring gear 48 of the first planetary gear set 24. The ring gear 48 causes the planet pinions 50 to rotate in the direction in which the drive shaft 10 rotates. Accordingly, the sun gears 44 and 54 tend to rotate in the direction opposite to the direction of rotation of the shaft 30, so that the planet pinions 58 of the second planetary gear set 26 rotate in the direction in which the drive shaft 10 rotates. The one-way brake 28 acts to prevent rotation of the pinion carrier 60 in the reverse direction and thus serves as a reaction brake for the forward drive. The ring gear 56 of the second planetary gear set 26 therefore tends to rotate in the direction of rotation of the drive shaft 10. The ring gear 56 thus rotates in this direction, thereby causing the driven shaft 34, which is splined to the ring 56, to rotate in the same direction, and the reduced gear ratio for the forward first drive is built up.

The intermediate speed power train is established when the second brake 20 is applied as the vehicle speed increases with the forward clutch 18 kept engaged. A power train is built up linking the turbine shaft 30 to the ring gear 48 through the engaged forward clutch 18. In this instance, however, the second brake 20 operates in a manner to hold the drum 62 stationary and serves as a reaction brake to prevent the rotation of sun gear 44. The planet pinions 50 therefore revolve around the sun gear 44 which is held stationary, and the pinion carrier 52 and accordingly the shaft 34 are driven at a speed lower than the revolution speed of the drive shaft 10. The intermediate or II speed range is thus established.

The D range is established when the reverse and high clutch 16 instead of the second brake 20 is coupled as the vehicle speed further increases with the forward clutch 18 kept engaged. The power delivered from the turbine shaft 30 is transmitted on the one hand to the ring gear 48 through the engaged forward clutch 18, and on the other hand to the sun gear 44 through the reverse and high clutch 16. Both the sun gear 44 and the ring gear 48 are consequently locked up and all of the rotary members of the first and second planetary gear sets rotate together at the same speed as the speed of the drive shaft 10. In this instance, the reverse and high clutch 16 and the forward clutch 18 serve as input clutches.

The friction clutches and brakes thus arranged are operated by a hydraulic control system which is shown in FIG. 2. As shown, the hydraulic control system operates on a fluid pressure which is supplied from a source of hydraulic pressure, which source may be actually the oil pump which has been designated by reference numeral 68 in FIG. 1. The pump 68, which may be of any suitable construction, is driven from the drive shaft 10 through the bladed impeller 36 of the torque converter 12. The pump 68 draws fluid from a sump 98 through a strainer 100 and discharges it into a line pressure conduit 102.

Designated by reference numeral 70 is a line pressure regulator valve. The valve 70 functions to regulate the fluid pressure in the line pressure conduit 102, and comprises a slidable valve spool 158 and a spring 160. The valve spool 158 is urged upwardly in the drawing by the spring 160.

The fluid pressure, which is regulated to a predetermined value by the line pressure regulator valve 70, is applied to the speed selector valve 74 through the conduit 102 and to the torque converter 12 through a conduit 104.

The conduit 104 communicates with a lubrication oil valve 112. The fluid pressure in the torque converter 12 is maintained within a desired range by a modulator valve 106 and, when the fluid pressure exceeds the upper limit of the range, the fluid is distributed through a valve 106 to a rear lubricating circuit (not shown) of the transmission. A relief valve 110 is provided in a conduit 108 to prevent an excessive supercharge of the torque converter circuit.

The speed selector valve 74 regulates the working fluids in the hydraulic circuits. The valve 74 comprises a valve piston 114 having a plurality of lands. The selector valve piston 114 is controlled by means of a manually operated selector lever (not shown), which is connected with the selector valve 74 by a mechanical linkage (not shown) so that the piston 114 can be moved to any of its operating positions. The selector valve 74 is connected with a 1–2 shift valve 76 by conduits 120 and 124, a 2–3 shift valve 78 by a conduit 126, a fluid locking valve 84 by a conduit 118, a solenoid down-shift valve 88 by a conduit 122, and a throttle back-up valve 90 by the conduit 122.

The 1–2 shift valve 76 causes the brakes 20 and 22 and clutches 18 to selectively engage and disengage for shifting between the first and second speeds. The valve 76 comprises a valve piston 134 provided with a plurality of lands. A spring 132 is provided to urge the piston 134 toward the right position as seen in the drawing. The valve 76 is connected with the hydraulic locking valve 84 by a conduit 136, the 2–3 shift valve 78 by conduits 178, 180 and 130, the forward clutch 18 by the conduit 120, the first governor valve 64 by the conduit 130, the brake 22 by a conduit 156 and the solenoid down-shift valve 88 by the conduit 180.

The hydraulic locking valve 84 is provided for the purpose of holding the transmission in the II range position once the selector valve 74 is set in the II range position. The valve 84 comprises a valve piston having a plurality of lands. A spring 176 is provided to urge the valve piston 174 upwardly of the drawing. The valve 84 is connected not only to the selector valve 74 and 1–2 shift valve 76 but with a fluid apply chamber 152 of fluid pressure operated servo means 96 by a conduit 138 for engaging the brake 20.

The 2-3 shift valve 78 produces selective engagement and disengagement of the clutches and brakes for shifting between the second and high speeds. The valve 78 comprises a slidable valve piston 142 and a spring 140 coacting the former. The valve 78 is connected, not only to the selector valve, governor valve, 1-2 shift valve and hydraulic locking valve but with the line pressure regulator valve 70 through the conduit 126, fluid release chamber 154 of the servo means 96 through a conduit 150 for disengaging the brake 20, solenoid down-shift valve 88 through the conduit 180, and vacuum sensitive throttle valve 92 through a conduit 144.

The first and second governor valves 64 and 66, respectively, are connected to the driven shaft 34 for the purpose of generating vehicle speed signals for use in the control system. The first and second governor valves 64 and 66, respectively, are connected with each other by the conduit 128. The second governor valve 66 is also connected to the clutch 18 and the shift valves 74 and 76 by the conduit 120.

A pressure modifying valve 82 functions to modify the build up rate of the fluid pressure in the line pressure conduit. The valve 82 is connected with the governor valve 64 by the conduit 130, 2-3 shift timing valve 86 by the conduit 130, and throttle valve 92 by the conduit 144.

The 2-3 shift timing valve 86 operates in a manner to establish a by-pass flow between the clutch 16 and the 2-3 shift valve 78 in accordance with an increase in the fluid pressure in the conduit 130 connected with the governor valve 64 through the conduit 130, thereby preventing shocks occurring when the intermediate speed is shifted to the high speed in the transmission. The valve 86 is also connected with the throttle valve 92 by the conduit 144.

The solenoid down-shift valve 88, which communicates with the conduits 122 and 180, controls the distribution of a down-shift pressure signal to the shift valves 78 and 76.

The throttle vacuum sensitive valve 92 functions to produce a throttle pressure which is inversely proportional to the intake manifold vacuum which varies with the angular position of the throttle valve in the carburettor (not shown). The throttle vacuum sensitive valve 92 is operated by a diaphragm 94 which is in communication with the intake manifold of the engine. The throttle pressure is applied to a throttle reducer valve 80 through the conduit 144 leading to the end portion of valve spool 142 of the 2-3 shift valve 78. The throttle reducer valve 80 functions to reduce the throttle pressure and then send thus reduced throttle pressure to the 1-2 shift valve 76 through a conduit 178.

Provided between the solenoid down-shift valve 88 and the vacuum throttle valve 92 is a throttle back-up valve 90 which modifies the throttle pressure.

When, in operation, the selector lever is moved to the D position, then the valve spool 114 is moved to a position in which the line pressure conduit 102 is permitted to communicate with ports a, b and c of the speed selector valve 74. The fluid pressure in the port a is carried through the conduit 116 to the lower part of the second lock valve 84, thereby acting on one end of the spool 174 so as to prevent the conduits 136 and 138 from being closed. The fluid pressure in the port a is also carried to the 2-3 shift valve through the orifice 146 and conduit 148. The fluid pressure in the port c is carried to the second governor valve 66, forward clutch 18 and 1-2 shift valve 76 through the conduit 120, the transmission being thus conditioned for its forward low speed position.

As the vehicle reaches a predetermined speed under these conditions, the governor pressure in the conduit 130 acts on the valve spool 134 to move the 1-2 shift valve so as to automatically shift from the forward low speed to the intermediate speed. With the conduit 120 in communication with the conduit 136, the fluid pressure now flows through the second lock valve to the conduit 138 and consequently to the fluid pressure apply chamber 152 of the fluid pressure operated servo means 96 so that the second brake 20 is applied, whereby the transmission is conditioned for its intermediate speed position.

Since, in this instance, the 1-2 shift valve is constructed to be small in size, the valve spool 134 is moved toward its leftmost position as seen in the drawing at a desired speed without varying the shifting points so that the automatic shift from the low speed to the intermediate speed is efficiently accomplished.

As the vehicle speed further increases and reaches another predetermined speed, the governor pressure in the conduit 130 proportionally increases until the valve spool of the 2-3 shift valve 78 is moved leftwardly to connect the conduit 148 with the conduit 150, whereupon the fluid pressure is carried from the conduit 150 to the fluid release chamber 154 of the servo valve 96 thereby to disengage the second brake 20 and to the reverse and high clutch 16 to engage the same. The transmission is in this manner conditioned for its forward high speed position.

When the selector lever is moved to the II range position, the valve spool 114 of the speed selector valve 74 is moved to a position in which the line pressure conduit 102 is permitted to communicate with the ports b, c and d. The fluid pressure in ports b and c is passed through the same routes as in the case where the D position is selected, with the results that the forward clutch 18 is coupled.

Since, on the other hand, there is absent a fluid pressure on the lower side of the second lock valve 84 and since the lower land of the valve spool 174 at which the fluid pressure in the conduit 118 is larger than the other, the fluid pressure in the conduit 118 is sufficient to overcome the force of spring 176, thereby moving the valve spool 174 downwardly of the drawing. At this instant, the conduit 118 is in communication with the conduit 138. The fluid pressure in the conduit 138 is now transmitted to the fluid pressure apply chamber 152 of the fluid pressure operated servo means 96, thereby engaging the second brake 20 so as to condition the transmission for its intermediate speed position. The fluid pressure in port d flows through the conduit 122 to the solenoid down-shift valve 88 and the throttle back-up valve 90. The port a of the speed selector valve 74 is isolated from the line pressure conduit 102. As a consequence, the fluid pressure does not flow through the conduit 116 into 2-3 shift valve 78, preventing the second brake 20 from disengaging and the reverse and high clutch 16 from engaging. Accordingly, the transmission can not be conditioned for its forward high speed position and thus the second lock valve 84, in cooperation with the speed selector valve 74, operates to hold the transmission for its forward intermediate speed position.

When the selector valve is moved to the I range position, the line pressure in the conduit 102 is admitted to ports c, d and e. The fluid pressure obtaining in the ports c and d is transferred through the same routes as in the case of the II position and is carried through the conduit 120 to the forward clutch 18 which consequently is now engaged. The fluid pressure in the port e is admitted through the conduit 124 and 1-2 shift valve 76 into the conduit 156. The fluid pressure in the conduit 156 is transferred to the low and reverse brake 22 which operates as a forward reaction brake, thereby conditioning the transmission for its forward low speed position ratio. The fluid pressure in the conduit 156 is also introduced into the left side of the 1-2 shift valve 76 in which the valve spool 134 is moved rightwardly of the drawing. Thus, the transmission remains in the forward first speed position until the selector valve 74 is moved out of the I range position.

What is claimed is:

1. In an automatic power transmission for a vehicle driven by an engine, said automatic transmission having a driving shaft driven by said engine, a driven shaft and a planetary gear unit having first and second planetary gear sets each having rotating members comprising a ring gear, a carrier carrying at least one planet pinion meshing with said ring gear and a sun gear externally meshing with said planet pinion, said carrier of said first planetary gear set being connected to said driven shaft, said sun gears of said first and second planetary gear sets being connected to each other and said ring gear of said second planetary gear set being connected to said driven shaft, a hydraulic control system comprising: clutch and brake means for controlling the relative motion of said rotating members of said planetary gear unit, said clutch and brake means having a forward clutch for connecting said driving shaft to the ring gear of said first planetary gear set during operation in an intermediate forward speed and a second brake for anchoring said common sun gears of said first and second planetary gear sets during operation of said planetary gear unit in said intermediate speed; hydraulic servo means for controlling said clutch and brake means, said hydraulic servo means having a first servo for actuating said forward clutch and a second servo for actuating said second brake for thereby providing said intermediate speed; a source of fluid pressure; a source of governor pressure; shift valve means communicating with said source of hydraulic pressure and said second servo, said shift valve means having a valve spool responsive to the governor pressure for blocking fluid communication between said source of hydraulic fluid pressure and said second servo when the governor pressure is below a predetermined level and establishing fluid communication between said source of hydraulic fluid pressure and said second servo when the governor pressure exceeds said predetermine level; a conduit connecting said first servo to said source of hydraulic fluid pressure; lock valve means communicating with said source of hydraulic fluid pressure through a first conduit, said second servo and said shift valve means, said lock valve means having a second conduit communicating with said source of fluid pressure and a valve spool responsive to the hydraulic fluid pressure in said second conduit for establishing communication between said shift valve means and said second servo when the hydraulic fluid pressure is applied to said second conduit and for establishing communication between said source of hydraulic fluid pressure and said second servo via said first conduit when the hydraulic fluid pressure is exhausted from said second conduit; a manual selector valve having a valve spool assumable to a Drive position and a II position, said valve spool blocking said second conduit and exhausting the hydraulic fluid pressure from said second conduit when in said II position, thereby causing said lock valve to establish fluid communication between said source of hydraulic fluid pressure and said second servo to lock said second brake.

2. A hydraulic control system according to claim 1, further comprising another shift valve means communicating with another servo and said second conduit, said other shift valve means having a valve spool, responsive to the governor pressure for clocking communicating between said second conduit and said other servo when the governor pressure is below another predetermined level which is higher than said predetermined level and for establishing communication between said second conduit and said other servo whereby when the manual selector valve is set in said II position and the hydraulic fluid pressure is exhausted from said second conduit, said other shift valve is overruled.

3. In an automatic power transmission for a vehicle driven by an engine said automatic transmission having a driving shaft driven by said engine, a driven shaft and a planetary gear unit having first and second planetary gear sets each having rotating members comprising a ring gear, a carrier carrying at least one planet pinion meshing with said ring gear and a sun gear externally meshing with said planet pinion, said carrier of said first planetary gear set being connected to said driven shaft, said sun gears of said first and second planetary gear sets being connected to each other and said ring gear of said second planetary gear set being connected to said driven shaft, a hydraulic control system comprising: clutch and brake means for controlling the relative motion of said rotating members of said planetary gear unit, said clutch and brake means having a forward clutch means for connecting said driving shaft to the ring gear of said first planetary gear set during operation in a low, an intermediate and a high forward speed, a reverse and high clutch means for connecting the common sun gears to said input shaft during operation in high forward speed and in reverse speed, a second brake means for anchoring the common sun gears during operation in said intermediate speed and a low reverse brake means for anchoring the carrier of said second planetary gear set during operation in reverse speed; hydraulic servo means for controlling said clutch and said brake means, said hydraulic servo means having a first servo for actuating said forward clutch means and a second servo for actuating said second brake means; a source of fluid pressure; a manual selector valve having a Drive position and a II position; a first conduit connecting said source of fluid pressure to said manual selector valve to transmit the fluid pressure to said manual selector valve; a source of governor pressure; a 1–2 shift valve communicating with said source of governor pressure, said 1–2 shift valve assumable to a first position when the governor pressure is below a predetermined level and to a second position when the governor pressure exceeds said predetermined level; a second conduit connecting said manual selector valve to said 1–2 shift valve through the solenoid downshift valve; a 2–3 shift valve communicating with said source of governor pressure, said 2–3 shift valve assumable to a first position when the governor pressure is below another predetermined level which is higher than said predetermined level and to a second position when the governor pressure exceeds said other predetermined level; a third conduit connecting said manual selector valve to said 2–3 shift valve; a second lock valve assumes a first position when the hydraulic pressure is applied to said third conduit and a second position when the hydraulic pressure is exhausted from said third conduit; a fourth conduit connecting said 1–2 shift valve to said second lock valve; a fifth conduit connecting said manual selector valve to said second lock valve; a sixth conduit connecting said second lock valve to said second servo; a seventh conduit connecting said manual selector valve to said first servo; said manual selector valve connecting said first conduit to said third, fifth and seventh conduits when said manual selector valve assumes said Drive position, said manual selector valve connecting said first conduit to said second, fifth and seventh conduits and exhausting said third conduit when said manual selector valve assumes said II position; said second lock valve establishing communication between said fourth conduit and said sixth conduit when in said first position and establishing communication between said fifth conduit and said sixth conduit when in said second position, whereby the hydraulic pressure is transmitted to said first servo through said seventh conduit and to said second servo through said fifth conduit and sixth conduit when said manual selector valve assumes II position, to lock the automatic transmission in its intermediate speed irrespective of the pressure level of the governor pressure.

4. A hydraulic control system according to claim 3, wherein said second lock valve comprises a housing having an outlet communicating with said sixth conduit, a first inlet communicating with said fifth conduit, second inlet communicating with said fourth conduit, a third inlet communicating with said third conduit and a bore, a valve spool slidably accomodated within said bore, said valve spool subjected to the fluid pressure of said third inlet and a spring means biasing said valve spool in said first position when the hydraulic pressure is applied to said third inlet and in said second position when the hydraulic pressure is exhausted from said third inlet, said valve spool having a plurality of lands formed thereon for blocking communication between said first inlet and said outlet when in said first position and for blocking communication between said second inlet and said outlet when in said second position.

\* \* \* \* \*